United States Patent [19]

Hock

[11] 3,756,723
[45] Sept. 4, 1973

[54] METHOD OF MEASURING THE DISPLACEMENT OF AN OBJECT AND ARRANGEMENT THEREFOR

[75] Inventor: Fromund Hock, Wetzlar, Germany

[73] Assignee: Ernst Leitz GmbH, Wetzlar, Germany

[22] Filed: Jan. 15, 1971

[21] Appl. No.: 106,735

[30] Foreign Application Priority Data
Jan. 27, 1970  Germany................... P 20 03 492.8

[52] U.S. Cl................. 356/110, 356/114, 356/169, 356/170, 250/220, 250/237 G, 356/113
[51] Int. Cl. ............................................ G01b 9/02
[58] Field of Search................... 356/114, 169, 170, 356/110, 113; 250/237 G

[56] References Cited
UNITED STATES PATENTS

| 3,198,061 | 8/1965 | Hock ................................. 356/169 |
| 3,344,700 | 10/1967 | Brake................................. 356/169 |
| 3,482,107 | 12/1969 | Hock ................................. 356/114 |
| 3,489,908 | 1/1970 | Hock et al. ......................... 356/114 |
| 3,508,834 | 4/1970 | Hock et al. ......................... 356/169 |
| 3,612,695 | 10/1971 | Bouwhuis et al. ............... 250/237 G |

Primary Examiner—Ronald L. Wibert
Assistant Examiner—Paul K. Godwin
Attorney—Krafft & Wells

[57] ABSTRACT

The method includes the steps of producing at least two bundles of light rays for measurement in one coordinate or at least four bundles of light rays for measurement in two coordinates by diffraction on a grating which is connected to the object to be measured or to a measuring head being provided with photoelectric detecting means. The bundles of light belong to different diffraction orders and pass through optical paths of substantially equal length and through a beam combiner wherein the polarized components are phase-shifted relative to one another. On leaving the beam combiner, the components are displaced in modulation phase by an angle unequal to $n \times 180°$ relative to one another and are detected by photoelectric means for providing signals from which the displacement of the object may be deduced.

18 Claims, 6 Drawing Figures

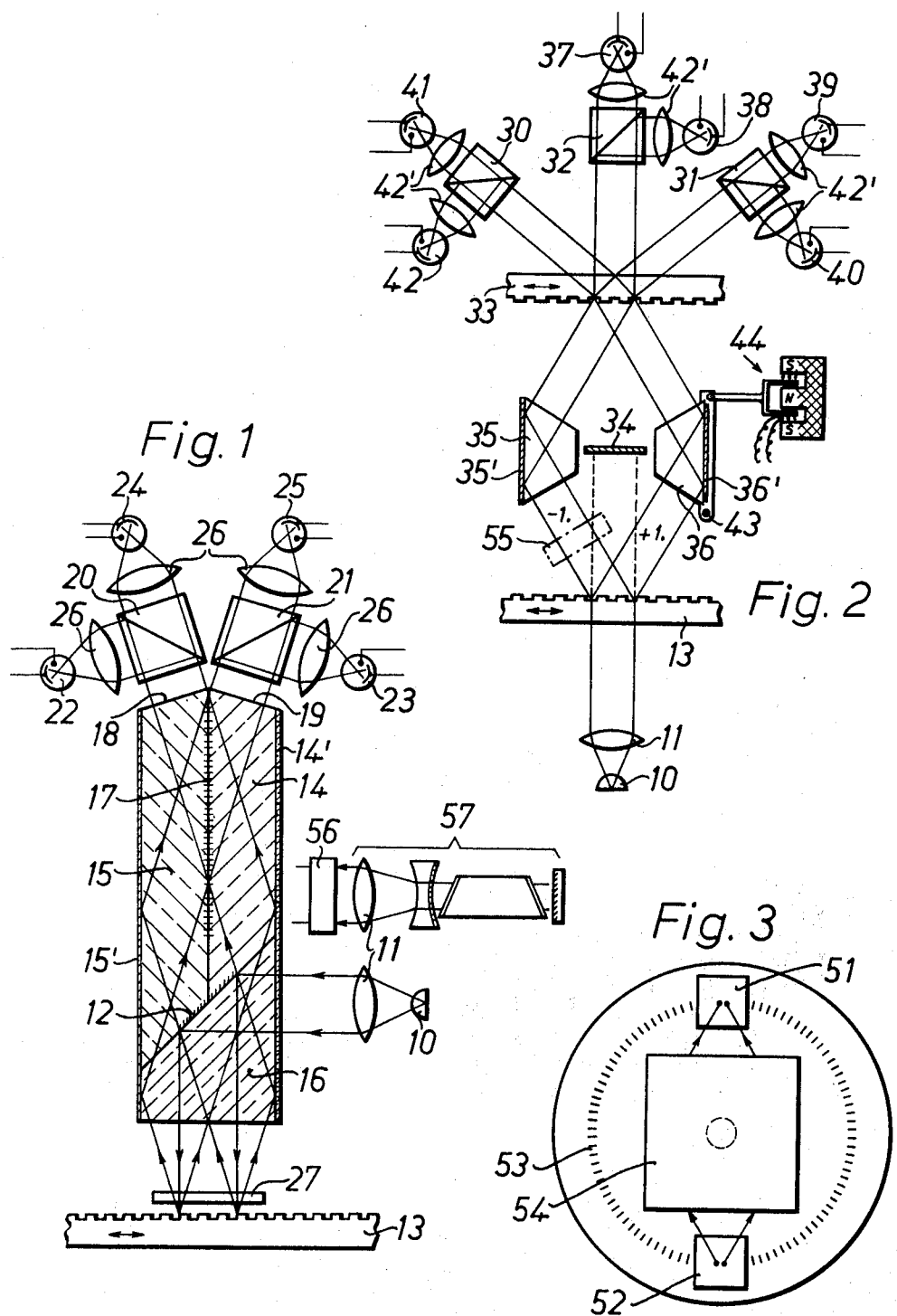

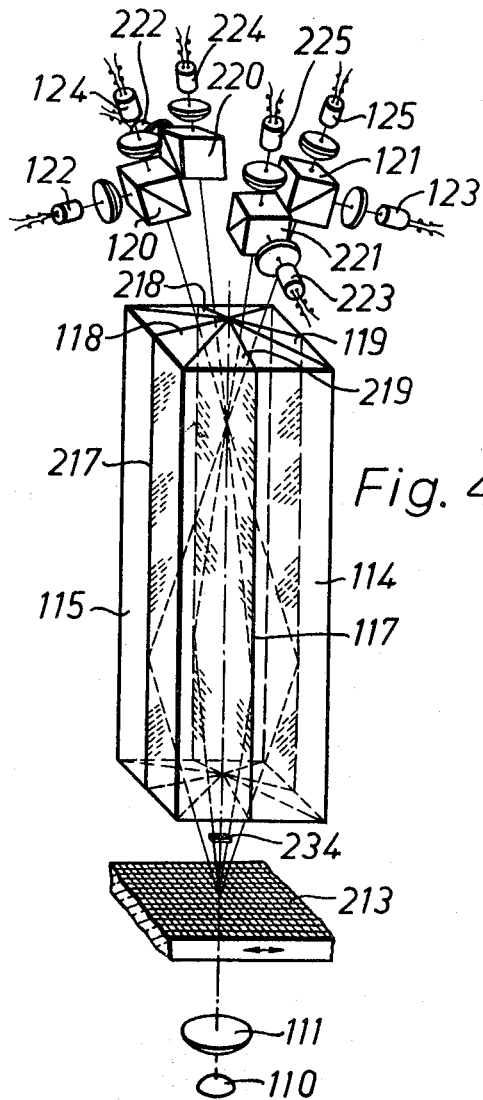
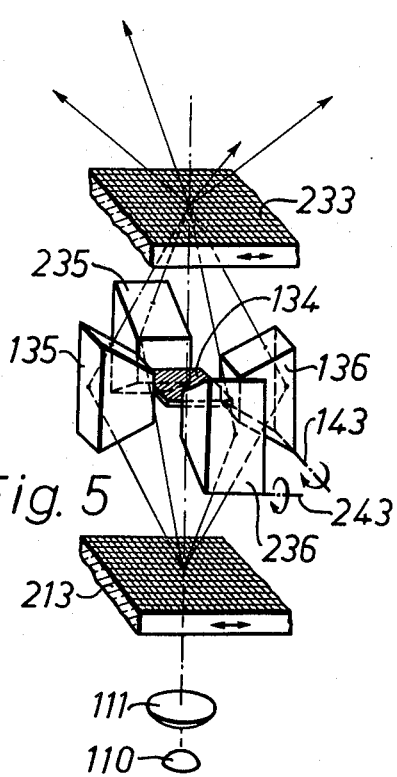
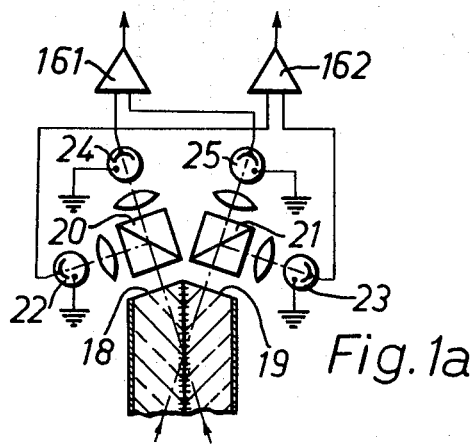
Fig. 4
Fig. 5
Fig. 1a ns3,756,723

METHOD OF MEASURING THE DISPLACEMENT OF AN OBJECT AND ARRANGEMENT THEREFOR

BACKGROUND OF THE INVENTION

The present invention relates to improvements in optical measuring arrangements and particularly to a measuring method for incremental transducers for measuring lengths or angles, with at least one diffraction grating which is moved in relation to a measuring head.

Incremental transducers are known in themselves. The problem arises of producing transducers of this type which work without image forming optical systems and which nevertheless enable forward/backward information and a measurement to be obtained from a common grating track.

SUMMARY OF THE INVENTION

According to the present invention there is provided a measurement method for measuring displacement of an object which is connected to a diffraction grating or to a measuring head of an optical measuring arrangement provided with photoelectric detecting means, wherein the grating and the measuring head are relatively displaced in accordance with the displacement to be measured and at least two bundles of light rays produced by diffraction on the grating and belonging to different diffraction orders pass with approximately plane wave fronts through optical paths of substantially equal length and then through a beam combiner with at least two outputs, and wherein at least one of the interfering bundles of light rays passes through optical elements which are anisotropic in relation to the phase-shift of different vibration azimuths of the light, and the optical elements are so arranged that components of the ray bundles on each ray bundle are polarized perpendicularly to one another and, on leaving the beam combiner, are displaced in modulation phase by an angle unequal to $n \times 180°$ in relation to one another, where n is a positive integer, and are received by the photoelectric means to provide electrical signals from which the displacement of the object may be deduced.

According to another aspect of the invention there is provided an arrangement for carrying out the method defined in the preceding paragraph, the arrangement comprising a light source which illuminates through a collimator objective a radial or linear diffraction grating with substantially parallel light, a composite prismatic optical element for receiving a plurality of beams of light from the grating, said element comprising a plurality of components of which at least two of said components have different anisotropic properties in relation to the light polarization, a partially reflecting mirror coating providing a beam combiner, and wherein said element is provided with at least two emergent surfaces of which at least one is followed by a polarizing splitter which splits into linear oscillation components the differently polarized beam components produced by the different anisotropies and transmits them to different photoelectric receivers.

According to an embodiment of the invention there is provided a measuring method utilizing incremental transducers in which at least two bundles of light rays, which are produced by a diffraction grating and belong to different diffraction orders, pass through optical paths of nearly equal length and then, for the purpose of interference, through a beam combiner having at least two outputs, and wherein at least one of the interfering bundles of light rays pass through optical elements which are anisotropic in relation to the light polarization, so that the light ray bundle components, which leave the beam combiner and are polarized at right angles to one another, are offset in relation to one another in the modulation phase by an angle unequal to $n \times 180°$, as direction-giving signals, where n is a natural integral number. For the purpose of carrying out this method use may be made of an arrangement in which a light source illuminates a radial or linear diffraction grating with substantially parallel light, by way of a collimator objective, this grating being followed by a prism which is composed of a plurality of parts and which is provided, as beam combiner, with a preferably low loss partially reflective mirror coating. Part of the prism is different in its anisotropic properties in relation to the light polarization, from another part of the prism, and the prism preferably has two emergent surfaces each of which is followed by a polarizing splitter which splits up into linear oscillation components the different beam components produced by the different anisotropies and transmits them to different photoelectric receivers. In this arrangement, an optical component group influencing the geometrical conformation of the optical path may be provided in the optical path between the grating and the beam combiner. It is, however, also possible for the arrangement for carrying out the method to be one in which the grating is followed by two mirrors or reflecting prisms which transmit the partial ray bundles to the beam combiner, while the two beam paths have different anisotropies in relation to the light polarization. The beam combiner may be a phase grating which is followed by at least two polarizing splitters, which splits up into linear oscillation components the differently polarized beam components, which are produced through the different anisotropies, and transmits them to different photoelectric receivers. One of the reflecting prisms may be movably mounted. The same grating may also be used as beam combiner. The diffraction grating may be a cross grating so that at least two pairs of partial bundles of rays situated in different planes are produced. Particularly advantageous as beam combiners are phase gratings of which the structure produces equal intensities in the $\pm 1$. and $\pm 3$. diffraction orders. This may, for example, be achieved by providing narrow slots in the ridges of the phase grating if corresponding surface portions are introduced as additional ridges in the gaps.

A particular advantage of an arrangement embodying the invention consists in that it includes no imaging systems so that the production of such an arrangement requires less effort than is involved in the construction of a conventional arrangement, and no focusing problems occur.

BRIEF DESCRIPTION OF THE DRAWINGS

The invention will be more readily comprehended from the following description when taken in conjunction with the appending drawings, wherein FIG. 1 shows an optical measuring arrangement embodying the invention;

FIG. 1a shows a modification of the arrangement of FIG. 1;

FIG. 2 shows another optical measuring arrangement embodying the invention;

FIG. 3 shows a further optical measuring arrangement embodying the invention and FIGS. 4 and 5 correspond to the arrangements of FIGS. 1 and 2 but with the use of a cross grating.

DESCRIPTION OF THE PREFERRED EMBODIMENTS

In the example illustrated in FIG. 1, a light source 10, for example a Ga As diode, illuminates through a collimator objective 11, and through a reflecting mirror 12, an incident light phase grating 13 which is connected to an object to be measured (not shown) and the flank depth introduces a wave retardation of $\lambda/2$, where $\lambda$ is the wavelength of the incident light. The light rays diffracted on this grating are reflected in different directions in accordance with the diffraction orders and the components of the $-1$ diffraction order are directed towards the left, while the components of the $+1$ diffraction order are guided towards the right. These components enter a prism composed of a plurality of parts 14, 15 and 16 and are deflected on the inner surface of the prism in such a manner that they penetrate and intersect one another. In order to obtain in the bundle of rays diffracted in the $+1$ diffraction order a phase difference between the wave fronts of the vertically and horizontally polarized components, the phase displacement of the total reflection is suppressed in the part 15 of the prism by a metal coating 15'. Through the combination of the refractive index of the prism component 14 and the refractive index and thickness of a dielectric coating 14' the desired phase angle is achieved. Between the prism components 14 and 15 there is disposed in the penetration region a beam combiner in the form of a partially reflective mirror surface 17.

After the combining of the beams, the light fluxes, which are interference modulated in phase opposition on the two sides of the beam combiner, are transmitted through separate emergent surfaces 18 and 19 to polarizing splitters 20 and 21, which split up the light fluxes into main oscillation directions in accordance with the different anistropies and transmit them to separate photoelectric receivers 22, 23, 24 and 25, each of which is preceded by a respective converging lens 26. If the phase displacement between the oscillation directions of the bundles of rays subjected correspondingly to interference is selected at 90°, an electric rotating field, which signals the direction of movement of the object (not shown) which is connected to the grating 13 at the moment in question, is formed at the outputs of the photoelectric receivers 22, 23 24 and 25.

The mirror 12 works additionally as a diaphragm which stops the light of the undesired 0 diffraction order.

As illustrated, an optical component assembly 27, for example in the form of a plane parallel plate, influencing the geometrical conformation of the optical path may be provided between the grating 13 and the prism provided with the components 14, 15 and 16, the plate 27 being displaced mechanically or electrically. The plate 27 serves, for example, for the adjustment of the zero position of the apparatus.

The total signals obtainable in a measurement coordinate, from a diffraction order pair of the same order, that is to say from the $-1$ diffraction order and the $+1$ diffraction order, make it possible with the aid of push-pull amplifiers as shown in FIG. 1a to obtain electric signals which are free from constant light influence. If a constant light signal, which is practically unmodulated, is derived from the push-pull amplifiers, the light source can additionally be monitored or satabilized with the aid of this constant light signal.

Instead of the Ga As diode which is indicated by the reference numeral 10, the light source used may, for example, be an incandescent lamp preceded by a narrow band interference filter or laser illumination 57. If a linearly polarized light source is to be used, either the dominant oscillation direction should be so directed that two components of approximately equal strength in respect of the anisotropic elements are obtained, or by means of an additional anisotropic element interposed in the path of the illumination, an approximately circular polarization of the light falling on the grating 13 may be effected. A modulator 56 may replace the simultaneous presence of two polarization components by the succession in time of these components.

FIG. 1a shows the coupling of the signals obtained at the photoelectric receivers 22–25 into pairs of push-pull signals. The push-pull signal amplifiers are denoted by symbols 161, 162. The circuit is positively derivable from the specification test, since the beams emanating from the exit surfaces 18 and 19 are modulated in a manner phase shifted by 180°, and the beam emanating from the two outputs of the polarizing splitters 20, 21 and being orthogonally polarized with respect to each other are shifted by respectively 90° in the modulation phase.

In the example of embodiment illustrated in FIG. 2, a light source 10 illuminates through a collimator lens 11, with transmitted light, a grating scale 13 connected to the object (not shown) to be measured. The light rays diffracted on the surface of this scale 13 are radiated in different directions in accordance with the orders of diffraction, and the components of the $-1$ diffraction order are directed to the left in FIG. 2 and components of $+1$ diffraction order to the right in FIG. 2. The left-hand bundle of rays encounters a reflecting prism 35, the reflecting surface of which is provided with a coating 35' for displacing the phase of the polarization components in one direction. The right-hand bundle of rays in FIG. 2 passes to a reflecting prism 36, the reflecting surface of which is provided with a coating 36' for displacing the phase of the polarization components in the other direction. Between the two prisms there is disposed a diaphragm 34 which prevents the direct transmission of the light flux between the grating 13 and the beam combiner. The beam combiner of FIG. 2 comprises a phase grating 33 which is followed by three polarizing splitters 30, 31 and 32, their spatial arrangement being such that the beam components originating from different diffraction orders are transmitted in accordance with the different polarizations to separate pairs 37, 38, 39, 40 and 41, 42 of photoelectric receivers. Each of these receivers is preceded by a respective converging lens 42'. As can easily be seen, there are produced at the receivers 39, 40 and 41, 42 respectively, signals which are coincident in phase with one another but in phase opposition to the signals at the receivers 37, 38. When the grating 13 is moved in the direction of the arrows, there is thus obtained, as output signals of the photoelectric receivers, a four-phase rotating field which is suitable for suppressing the signal components originating from constant light components. As illustrated in FIG. 2 for the prism 36, one of the reflecting prisms may be mounted for angular displacement about an axis 43, so that through the angular deflection of this prism the arrangement illustrated can be adjusted. If this angular deflection is effected by means of an electrically operated drive mechanism 44 (such as a solenoid system), further effects can easily be obtained, for example the introduction of a correction value, modulation, etc.

As indicated in FIG. 2, the grating 33, which is used as a beam combiner, may also be movably mounted. By this means it is possible for both the rating 13 and 33 to be moved during the measuring operation and for their relative movement to be measured. The two gratings 13 and 33 may also be rigidly connected together mechanically.

An example of an arrangement in which two gratings such as the grating 13 and 33 of FIG. 2 are rigidly connected together, is illustrated diagrammatically in FIG. 3. Here the two gratings 13 and 33 of FIG. 2 are components of a radial grating 53, above which a reflecting and phase displacement system 54 containing corresponding components, such as mirrors, prisms, electrically driven adjusting device, etc., is disposed. In FIG. 3 the light source 10 and the collimator lens 11 of FIG. 2 are disposed behind the grating 53 and light from the source 10 illuminates the grating 53 from the rear-side. The grating 53 is followed by a reversing mirror 52, which transmits to the system 54 the bundle of light rays diffracted on the grating 53. A further reflecting mirror 52 is located in a position diametrally opposite the mirror 52, relative to the grating 53. The mirror 52 directs the bundles of rays coming from the system 54 to the grating 53, and acts as a beam combiner. In a manner analogous with the arrangement illustrated in FG. 2, polarizing splitters of FIG. 3 are disposed opposite the reflecting mirror 51 on the remote side of the grating 53, these splitters transmitting the different light beam components to separate photoelectric receivers in such a manner that, on the rotation of the grating 53, an electric four-phase rotating field is obtained as output signals.

The embodiments illustrated in FIGS. 1 and 2 are both equipped with gratings which permit measurement in one co-ordinate direction. If, however, it is desired to measure in two co-ordinate directions, corresponding cross gratings will be required. In this case a transmitting light grating oriented in two directions may be provided of which the effect corresponds to the effect of the grating shown in FIG. 1. The prism composed of the plurality of parts 14 to 16 should be so constructed that, in respect of both co-ordinate directions, it has the shape illustrated in FIG. 1, with the exception of the mirror surface 12 which is now unnecessary and which is replaced by a stopper such as that indicated in FIG. 2 by the reference 34. The prism has two partially reflective mirrors, which are inclined at an angle to one another which corresponds to that between the co-ordinate directions. The mirrors serve as beam combiners and the prism is provided with four emergent surfaces, each of which is followed by a polarizing splitter. Two photoelectric receivers, the output signals of which are phase displaced by 90° in relation to one another, are associated with each splitter, wth the interposition of converging lenses. It may be convenient for those input surfaces of the composite prism which face the grating, to be inclined in the direction of the center line of the prism. Refraction at the perpendicular passage through the input surface is thereby avoided.

When the above remarks are applied to the example in FIG. 2, the beam combiner used must also be a cross phase grating, the co-ordinate directions and grating constants of which must coincide with those of the cross grating used as the measuring grating. The remainder of the apparatus should be constructed in accordance with these co-ordinate directions, and consequently four reflecting prisms must be provided. From the remarks made in connection with FIG. 2, it is clear that the beam combiner must be followed by at least three polarizing splitters, two of which are offset in relation to one another by the angle enclosed by the measurement co-ordinates.

In order to obtain measurement signals modulated to a carrier frequency in the arrangements for carrying out the method described above, at least one electrooptical or elasto-optical component 55 (FIG. 2), which controls the optical thickness or the phase difference of polarized bundles of light rays, may be inserted in one of the diffracted partial bundles of rays interfering wth one another. In the case of illumination with linear light, the reversal of the direction of polarization from one linear oscillation direction to another is also possible with a component 56 (FIG. 1) of this kind. In this case, the polarizing splitters following the beam combiners are not required, but are replaced by switches, controlled with the modulation frequency, in the signal processing arrangement.

In case an absorbing beam combiner is used the two partial bundles must not necessarily be anisotropic. However, then no 180° phase-displaced signals will be obtained because due to the absorption in the beam combiner the phase difference of the interfering phases of its two output surfaces may turn out to be different from 180°. Consequently, only signals may be obtained which indicate the direction of counting (elliptical rotatory field).

FIGS. 4 and 5 correspond to the arrangements of FIGS. 1 and 2, but with the use of a cross grating. The reference numerals are the same as in FIGS. 1 and 2, except that the numerals 1 and/or 2 have been in front of the number of FIGS. 1 and 2. The prism for beam combination differs in FIG. 4 from that of FIG. 1 only in that the part 16 is missing, and that, at right angles to the partially permeable mirror surface 17 (117), another partially permeable mirror surface 217 is provided. The prism now has four exit surfaces 118, 119, 218, 219, with a corresponding number of polarizing splitters and receivers connected thereafter.

I claim:

1. A method for measuring the displacement of an object which is connected to a diffraction grating or to a measuring head of an optical measuring arrangement provided with photoelectric detecting means, wherein the grating and the measuring head are relatively displaced in accordance with the displacement to be measured, the method comprising the steps of producing at least two bundles of light rays diffracted by the grating, said bundles belonging to different diffraction orders; of directing said bundles with approximately plane wave fronts through optical paths of substantially equal length and then for interference through a beam combiner having at least two outputs, wherein at least one of the interfering bundles of light rays passes through optical elements which are anisotropic in relation to the phase-shift of different vibration azimuths of the light, said optical elements being so arranged that the components of said one of the interfering bundles are polarized perpendicularly to one another and, on leaving the beam combiner, are displaced in modulation phase by an angle other than $n \times 180°$ in relation to one another, where n is a positive integer, and of detecting said modulation phase of said bundle components by said photoelectric means whereby electric signals are generated from which the displacement may be deduced.

2. An apparatus for measuring the displacement of an object which is connected to a diffraction grating or to a measuring head of an optical measuring arrangement provided with photoelectric detecting means, wherein the grating and the measuring head are relatively displaced in accordance with the displacement to be measured, comprising:
 a. a diffraction grating connected to the object to be measured and being displaceable therewith;
 b. a light source for illuminating said diffraction grating with substantially parallel light;
 c. a composite prismatic optical element for receiving a plurality of beams of light from said grating, said element comprising a plurality of components of which at least two of said components are optical elements having different anisotropic properties to phase-shift said parallel light into differently phase-shifted beam components in relation to the different vibration azimuths of the light;
 d. a partially reflecting mirror coating providing a beam combiner in said element;
 e. at least two emergent surfaces being provided on said element of which surfaces at least one is followed by a polarizing splitter which splits into linear oscillation components said differently phase-shifted beam components; and
 f. a plurality of photoelectric receivers whereto each of said linear oscillation components are respectively transmitted for generating electric signals.

3. The apparatus as defined in claim 2, wherein said parallel light is linearly polarized light and at an angle of 45° to the principal cuts of polarizing anisotropic elements.

4. The apparatus as defined in claim 2, wherein said parallel light contains light rays of all azimuths of vibration.

5. The apparatus as defined in claim 2, wherein said parallel light is circularly polarized light.

6. The apparatus as defined in claim 2, wherein an optical component assembly influencing the geometrical configuration of the optical path is provided in the optical path between the grating and the beam combiner.

7. The apparatus as defined in claim 2, and further comprising an electro-optical element inserted in the path of one of the bundles of rays for controlling the phase difference between differently polarized components.

8. The apparatus as defined in claim 2, and further comprising an elasto-optical element inserted in the path of one of the bundles of rays for controlling the phase difference between the differently polarized components of the bundle of light rays.

9. The apparatus as defined in claim 2, and further comprising a modulator in the optical path of said light source for varying the direction of polarization of the light, and switching means for modulator-dependent selecting of the electric signals generated by the photoelectric receivers.

10. The apparatus as defined in claim 2, wherein the diffraction grating comprises a cross-grating, and wherein at least two pairs of partial light ray bundes are produced in different planes, the composite prismatic element being symmetrically shaped in two directions corresponding to the coordinate directions of the diffraction grating, and pairs of photoelectric receivers being provided for producing the electric signals.

11. The apparatus as defined in claim 2, and further comprising push-pull amplifiers to the input of which, after the combining of the beams, said linear oscillation components are fed in pairs which are opposite in phase.

12. An apparatus for measuring the displacement of an object which is connected to a diffraction grating or to a measuring head of an optical measuring arrangement provided with photoelectric detecting means, wherein the grating and the measuring head are relatively displaced in accordance with the displacement to be measured, comprising:
 a. a diffraction grating connected to the object to be measured and being displaceable therewith;
 b. a light source for illuminating said diffraction grating with substantially parallel light;
 c. at least two optically reflecting anisotropic surfaces for receiving two beams of light from the grating to produce partial bundles of rays;
 d. a beam combiner whereto the partial bundles of rays forming the beams are directed by said reflecting surfaces, the two ray paths of the respective beams having different anisotropics in relation to the light polarization;
 e. a phase grating being part of said beam combiner;
 f. at least one polarizing beam splitter being arranged behind said phase grating in the direction of light travel, said beam splitter splitting differently polarized beam components into linear oscillation components; and
 g. photoelectric receivers whereto said linear oscillation components are transmitted for generating electric signals.

13. The apparatus as defined in claim 12, wherein at least one of the optically reflecting surfaces is movably mounted.

14. The apparatus as defined in claim 12, wherein the grating has a structure which produces equal intensities in the ±1 and ±3 diffraction orders.

15. The apparatus as defined in claim 12, wherein the diffraction grating and the phase grating comprise a single grating.

16. The apparatus as defined in claim 12, wherein said parallel light is linearly polarized light and at an angle to the principal cuts of the polarizing anisotropic elements.

17. The apparatus as defined in claim 12, wherein said parallel light contains light rays of all azimuths of vibration.

18. The apparatus as defined in claim 12, wherein said parallel light is circularly polarized light.

* * * * *